Feb. 6, 1951   G. T. ALLEN   2,540,183
BALANCED POPPET VALVING SYSTEM
Filed March 15, 1949
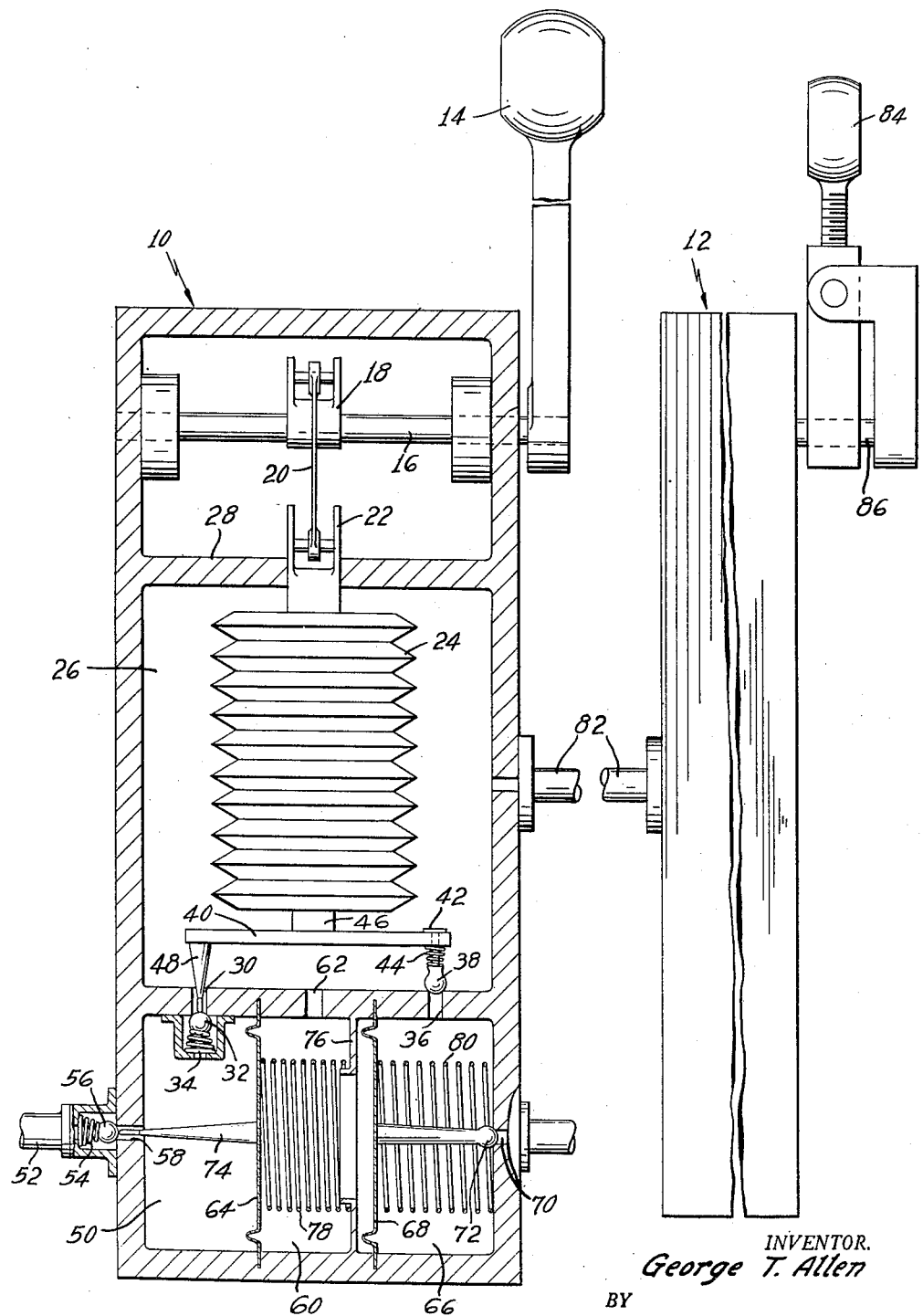
INVENTOR.
George T. Allen
BY
Pennie, Edmonds, Morton and Barrows
ATTORNEYS Patented Feb. 6, 1951

2,540,183

UNITED STATES PATENT OFFICE 2,540,183

BALANCED POPPET VALVING SYSTEM

George T. Allen, New York, N. Y., assignor to Simmonds Aerocessories Inc., Tarrytown, N. Y., a corporation of New York Application March 15, 1949, Serial No. 81,517

11 Claims. (Cl. 303—54)

My invention relates to improvements in poppet valving systems including a plurality of poppet valves, and more particularly an arrangement for balancing the forces on the poppet valves.

Two poppet valves are normally required for servo mechanisms, one for controlling the inlet and the other for controlling the exhaust of the pressure fluid from the pressure control chamber. A particular application of the valving system of my invention is its use in a sending unit of a servo system for positioning a servomotor valve from a remote location. In such systems the sending unit provides a signal pressure which is transmitted to a receiving unit for positioning the servomotor valve and thereby causing actuation of the servomotor.

One of the problems involved in the operation of such servo mechanisms is that the servomotor valves are positioned by relatively sensitive mechanism and there is usually little force available to move the valve, particularly near the sensitive or neutral position. The apparatus of the present invention comprises an arrangement for balancing out the forces on the poppet valves, particularly near neutral, and thereby making possible the use of such valves with low force actuating means in the sending unit.

The primary object, therefore, of the present invention is to provide a poppet valving system of novel character which may be employed for various purposes, as a pressure regulating system.

Accordingly, an apparatus to which the present invention relates includes a poppet valving system in general associated with a pressure control or selection chamber which may have an outlet port for pressure fluid, a supply chamber for pressure fluid connected by a passageway with the pressure selection chamber, a poppet valve controlling said passageway, an inlet port for the supply of pressure fluid to the supply chamber, said port having a valve for controlling fluid flow, means for maintaining a selected higher pressure in the supply chamber than that in the pressure selection chamber, means responsive to changes in pressure differential between the pressure selection chamber and the supply chamber for operating the valve controlling the port thereof, and means responsive to changes in the pressure of the fluid in the selection chamber for operating the poppet valves in the inlet and exhaust passageways.

My improved apparatus preferably also includes an exhaust chamber connected into the outlet passageway from the pressure selection chamber, the exhaust chamber having a valve-controlled outlet port, means for maintaining a selected lower pressure in the exhaust chamber than that in the pressure selection chamber, and means responsive to changes in pressure differential between the pressure selection chamber and the exhaust chamber for controlling the valve in the outlet port thereof.

The supply chamber for fluid is provided as a reservoir for fluid at a predetermined pressure above that in the pressure selection chamber, the difference, however, being small, so that the load on the poppet valve between the two chambers is relatively low.

The exhaust chamber, on the other hand, is provided for maintaining a pressure slightly below that in the pressure selection chamber, thereby providing a relatively low load on the poppet valve controlling the passageway between said chambers. The pressure differentials are advantageously the same.

My improved valving system includes other features, objects and advantages which will be described in detail hereinafter in connection with the accompanying drawings, in which the single figure is a broken view partly in vertical section showing my improved valving system, associated for illustrative purposes with the sending unit of a servo mechanism.

The drawing shows a sender unit 10 embodying the features of the poppet valving system in section associated with a receiving unit 12 shown only diagrammatically. The sender unit, as shown, comprises an input lever 14 used for setting the pressure in the sender unit, this lever being keyed to a shaft 16 carrying a lever 18 connected by a link 20 to an end member 22 attached axially to a pressure sensitive capsule 24 mounted in a pressure selection chamber 26. The chamber 26 is adapted to support a considerable pressure, and accordingly, the member 22 is slidable up and down vertically in a bearing, not shown, mounted in the top wall 28 of the chamber 26.

The chamber 26 is provided with an inlet passageway 30 controlled by a poppet valve comprising a ball 32 and a spring 34, preferably arranged upstream of the passageway, as shown. An outlet passageway 36 is also provided, it also being controlled by a poppet valve upstream of the passageway. This valve comprises a ball 38 carried on a stem extending loosely through a hole in a bar 40 and secured thereto for limited movement by a head 42 on the stem. A spring 44 between the bar 40 and the ball 38 permits of relative movement between the ball 38 and the bar 40. The bar 40 extends across to the inlet valve below the capsule 24, and the center of the bar is secured to the axis of the capsule by means of a connecting member 46. The opposite end of the bar 40 from the valve closure 38 carries a tapered pin 48 extending into the passageway 30 and adapted to move the ball 32 off its seat.

A gaseous pressure fluid such as air at from 70 to 100 p. s. i. is normally supplied to the chamber 26 through the inlet passageway 30, and in accordance with the present invention, this is advantageously effected by providing a supply chamber 50 arranged to deliver fluid under pressure through the passageway 30 upon opening of the poppet valve provided for its control. Air or other gaseous fluid under pressure is supplied to the chamber 50 from a pump or other pressure source, not shown, through a pipe 52 and a poppet valve comprising a spring 54 and a ball 56, upstream of a passageway 58 leading to the chamber 50.

An advantageous structure for the valving arrangement, including the chamber 50, is provided below the chamber 26 and includes a pressure control chamber 60 connected with the pressure selection chamber 26 by an open passageway 62, and separated from the chamber 50 by a thin diaphragm wall 64. The apparatus also includes an exhaust chamber 66 mounted opposite chamber 50 and separated from the chamber 60 by a thin diaphragm wall 68. The outlet passageway 36 discharges into the exhaust chamber 66 and this chamber is provided with an exhaust passageway 70 for relieving pressure on the system, this passageway being controlled by an upstream poppet valve closure 72 connected, as shown, to the central portion of the diaphragm 68. The area of the walls 64 and 68 are advantageously equal.

The diaphragm 64 carries a tapered pin 74, the free end of which extends into the passageway 58 and is arranged for unseating the ball 56 of the poppet valve controlling the admission of fluid to the chamber 50. An annular bracket 76 is mounted in the chamber 60 parallel to the diaphragm walls 64 and 68, and it carries a biasing spring 78 which bears against the diaphragm 64. A similar biasing spring 80 is mounted in the chamber 66 and bears against the diaphragm 68 to bias the poppet valve member 72 toward open position against the pressure in the chamber 60.

The sender unit, as described, is adapted to supply pressure fluid at a selected pressure from the chamber 26 through a conduit 82 to the receiving unit 12 which may be positioned at a remote point from the sending unit, the fluid pressure therein operating a pressure-sensitive means for controlling any desired apparatus such as illustrated, for example, a servomotor mechanism. Actuation of the input lever 14, therefore, is adapted to actuate the mechanism of the receiver 12 to position an output lever 84 mounted on a shaft 86 which is rotated by the servomotor.

The control valving described above in connection with the sender unit is intended to provide a minimum actuating load at and near the sensitive position of the valves 32 and 38. This is accomplished by balancing out the forces tending to move the two valves in opposite directions. These valves are subjected to forces due to the unbalanced pressure acting across the poppet area, that is, the cross-sectional area of the passageways 30 and 36. In the arrangement as shown, the force acting on the ball 32, since a higher pressure is maintained in the chamber 50 than in the chamber 26, tends to move it upward toward its seat, while the force on the ball 38, since the pressure in the chamber 26 is greater than that in the chamber 66, tends to move it downward toward its seat. These forces act to positively seal the valves and therefore aid in reducing leakage from one chamber to the other.

In the control valving arrangement, the mechanism associated with the valves 32 and 38 is arranged to balance out the load on the valve actuating means, that is, to make the downward force on the valve member 38 equal the upward force acting on the valve member 32.

This is accomplished in the preferred construction by making the cross-sectional area of the passageways 30 and 36 equal to each other and by maintaining an equal pressure drop across the two valves.

This equal pressure drop is accomplished by providing the chambers 50, 60 and 66, together with the controls for the valves 56 and 72, which are preferably poppet valves, as shown. The valve mechanism including the ball 56, the pin 74, the diaphragm 64 and the spring 78, are arranged in conjunction with the pressure chamber 60 to maintain the pressure in the chamber 50 at a preselected value above the pressure in the chamber 26 (which is the same as that in the chamber 60). It will be noted in the construction, as shown, that the spring 78 may be selected to maintain the desired pressure differential.

In a similar manner the valve 72 actuated by the diaphragm 68 acting against the spring 80 is adapted to maintain the pressure in the chamber 66 a given amount below the pressure in the chamber 26. The spring 80 may be selected with reference to the spring 78 so that the pressure differentials between the chambers 50 and 66 and the chamber 26 are equal, that is, assuming that the cross-sectional areas of the passageways 30 and 36 are the same. Any other arrangement which satisfies the expression: $p_a A_a = p_b A_b$, would serve as well, where "$p$" and "$A$" are the pressure differential and the effective area, respectively.

While the pressure differential referred to may not be accurately maintained under transient conditions, due to the spring rate effects on the valves 56 and 72, this, however, is not critical because of two factors. First, the regulation will still be accurate enough to make the change in forces on valve 32 or valve 38 a second order effect. Second, as greater departures from neutral position are encountered, greater forces are usually available for the operation of the valve.

The operation of the apparatus may be illustrated in the following manner by assuming that the input lever 14 is moved from some previously set position to a new position so that it lowers the upper end of the capsule 24, or assuming that the pressure in chamber 26 decreases, thereby causing downward movement of the lower end of the capsule, which in turn causes the pin 48 to move the poppet valve ball 32 off its seat and to permit fluid to flow from chamber 50 into the chamber 26. During the downward movement of the capsule 24 the bar 40 also compresses the spring 44 and the valve 38 is kept closed. The resulting increase of pressure in the capsule chamber 26 compresses the capsule until the bar 40 is raised sufficiently to permit the ball 32 to engage its seat. The higher pressure signal in the chamber 26 is transmitted to the chamber 60 to move the diaphragm 64 to the left to open the valve 56 to maintain the predetermined pressure differential between the chambers 50 and 26.

In this operation the opening of the valve 32 to permit pressure fluid to flow into the chamber 26 causes the pressure in the chamber 50 to fall below the value set by the control pressure in the chamber 60, plus the effect of the spring 78. This results, as stated above, in the unseating of the valve ball 56 to admit more air to the chamber 50. The chamber 50, therefore, maintains a small reservoir of fluid at a pressure which is higher than the control pressure in the chambers 26 and 60 by a constant value.

When the input lever 14 is moved in a direction to elevate the top of the capsule 24, or when an excessive pressure occurs in the chamber 26 causing the capsule 24 to collapse, the bar 49 is raised, unseating the valve 38 and releasing fluid into the exhaust chamber 66. The flow of fluid from the chamber 26 into chamber 66 changes the pressure differential between these two chambers, so that the diaphragm wall 68 is moved to the left to open the exhaust valve 72 to permit fluid to exhaust from the system. In other words, when the pressure difference between the chambers 26 and 66 is less than the set amount, the valve 72 opens and reduces the pressure in the chamber 66 to the predetermined differential.

From the foregoing, it will be seen that the pressure drops between the chambers 50 and 26, and 66 and 26, through the passageways 30 and 36, are under the control of the valves 56 and 72, respectively, and that by proper arrangement of these valves, the net force on the capsule 24, due to the poppet valves 32 and 38, can be reduced to zero, at least for the condition where both valves 32 and 38 are on their seats. The moments caused by forces at the valves 32 and 38 are absorbed by bending rigidity of the capsule 24 or its supporting structure. In this connection, suitable guide means may be provided for the bar 49 to maintain it substantially horizontal, without relying upon the rigidity of the capsule 24, this means at the same time insuring the positioning of the valve 38 and the pin 48. In the present showing, the pin 48 will be positioned by the passageway 30 and the lower end of the ball 38 may carry a small pin to insure its positioning with respect to the passageway 36.

While in the foregoing description the valve system has been illustrated in connection with a particular type of sender unit, it is to be understood that the invention is not so limited, but that other means than the capsule 24 may be used for actuating the poppet valves controlling the admission and exhaust of fluid from this chamber.

Furthermore, while the improved apparatus advantageously includes the chamber 60, other and equivalent arrangements may be provided so that the valves 56 and 72 are made responsive to the pressure of the fluid in the chamber 26.

What I claim as new is:

1. A poppet valving system for a pressure regulator, comprising a pressure selection chamber, supply and exhaust chambers for pressure fluid connected by passageways with the pressure selection chamber, a poppet valve controlling each of said passageways, an inlet port for the supply chamber having a valve therefor, an exhaust port for the exhaust chamber having a valve therefor, means for maintaining a higher pressure in the supply chamber than that in the pressure selection chamber, means for maintaining a lower pressure in the exhaust chamber than that in the pressure selection chamber, and means responsive to changes in the pressure differential between the pressure selection chamber and the supply and exhaust chambers for respectively controlling the operation of the valves for said ports.

2. A system as defined by claim 1 characterized in that said responsive means includes a diaphragm subject to the pressure in the pressure selection chamber and to the pressure in one of said other chambers, means carried by said diaphragm for opening the valve for the port to the one of said other chambers, and a spring biasing said diaphragm toward valve opening position.

3. A system as defined by claim 1 characterized by including means for selecting the pressure for said pressure selection chamber, and means responsive to the operation of said pressure selecting means to increase the pressure in said pressure selection chamber for opening the valve for the passageway between it and the supply chamber.

4. A system as defined by claim 1, characterized by including means for selecting the pressure to be maintained in the pressure selection chamber, and means responsive to the operation of said pressure selecting means to decrease the pressure in the pressure selection chamber for opening th valve for the passageway between it and the exhaust chamber.

5. A system as defined by claim 1 characterized by including means arranged so that the pressure differential maintained between the supply chamber and the pressure selection chamber times the cross-sectional area of the passageway between these chambers is equal to the pressure differential maintaind between the exhaust chamber and the pressure selection chamber times the cross-sectional area of the passageway between these chambers.

6. A valving system for a multi-stage pressure regulator comprising a pressure control chamber, a supply chamber, an exhaust chamber, a passageway for supplying a gaseous pressure fluid from the supply chamber to the pressure control chamber, a passageway for exhausting gaseous pressure fluid from the pressure control chamber to the exhaust chamber, a poppet valve for each of said passageways movable down-stream to a closing position, means for opening said valves, a valved passageway for delivering a gaseous pressure fluid to the supply chamber, a valved passageway for discharging gaseous pressure fluid from the exhaust chamber, control means for maintaining a preselected pressure in the supply chamber above the pressure in the pressure control chamber, such control means including means responsive to an increase in pressure in the pressure control chamber for opening the valve in the passageway for supplying gaseous pressure fluid to the supply chamber, and a second control means for maintaining a preselected pressure in the exhaust chamber below the pressure in the pressure control chamber, such second control means including means responsive to a decrease in the pressure in the pressure control chamber for opening the valve in the passageway for discharging gaseous pressure fluid from the exhaust chamber.

7. A system as defined by claim 6 characterized in that the supply and exhaust chambers are spaced apart by a second pressure chamber opening into said pressure control chamber, said second pressure chamber being separated from each of said supply and exhaust chambers by diaphragm walls of similar area, means carried by the respective diaphragm walls for opening the valve in the valved passageway for the respective supply and exhaust chambers, and similar springs biasing said diaphragm walls toward a position for opening the valve in the respective valved passageways for the supply and exhaust chambers.

8. A system as defined by claim 6 in which the cross-sectional area of the passageways to and from the pressure control chamber are the same.

9. A system as defined by claim 6 characterized by including a poppet valve in the supply and exhaust passageways for respectively delivering gaseous pressure fluid to the supply chamber and exhausting gaseous pressure fluid from the exhaust chamber.

10. A pressure regulator comprising a pressure selection chamber adapted to contain a gaseous pressure fluid under the selected pressure, means operatively arranged in said chamber for selecting the pressure for the gaseous fluid therein, a passageway connected into said chamber through which the gaseous fluid is supplied at the pressure in the chamber, a chamber for supplying gaseous pressure fluid to the pressure selection chamber, a chamber for exhausting gaseous pressure fluid from the system, a passageway having a poppet control valve therein for conducting gaseous pressure fluid from the supply chamber to the pressure selection chamber, a passageway having a poppet valve therein for conducting gaseous pressure fluid from the pressure selection chamber to the exhaust chamber, an inlet port having a poppet valve therein for supplying gaseous pressure fluid to the supply chamber, an exhaust port having a poppet valve therein for discharging gaseous pressure fluid from the exhaust chamber, means responsive to a demand for an increase in the pressure in the pressure selection chamber for opening the valve in the passageway for conducting gaseous pressure fluid from the supply chamber to the pressure selection chamber, means responsive to a demand for a decrease in the pressure in the pressure selection chamber for opening the valve in the passageway for conducting gaseous pressure fluid from the pressure selection chamber into the exhaust chamber, means for maintaining a higher pressure in the supply chamber than that in the pressure selection chamber including means responsive to a decrease in the pressure differential between the pressure selection chamber and the supply chamber for opening the valve for said inlet port, and means for maintaining a lower pressure in the exhaust chamber than that in the pressure selection chamber including means responsive to a decrease in the pressure differential between the pressure selection chamber and the exhaust chamber for opening the poppet valve in said exhaust port.

11. A valving system as claimed in claim 10 in which the means for selecting the pressure of the gaseous fluid in the pressure selection chamber comprises a bellows, means for actuating said bellows, and means responsive to the actuation for operating said poppet control valves.

GEORGE T. ALLEN.

REFERENCES CITED

The following references are of record in the file of this patent:

UNITED STATES PATENTS

| Number | Name | Date |
|---|---|---|
| 2,383,894 | Sloane | Aug. 28, 1945 |